(12) United States Patent
Conte

(10) Patent No.: US 8,861,649 B2
(45) Date of Patent: Oct. 14, 2014

(54) POWER REDUCTION IN PHYSICAL LAYER WIRELESS COMMUNICATIONS

(75) Inventor: Thomas M. Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 1186 days.

(21) Appl. No.: 12/390,957

(22) Filed: Feb. 23, 2009

(65) Prior Publication Data

US 2010/0215129 A1    Aug. 26, 2010

(51) Int. Cl.
*H04L 27/06* (2006.01)
*G06F 17/14* (2006.01)
*H04L 27/26* (2006.01)

(52) U.S. Cl.
CPC ........... *G06F 17/142* (2013.01); *H04L 27/2601* (2013.01); *Y02B 60/50* (2013.01)
USPC ........... 375/340; 375/219; 375/260; 708/403; 708/404; 708/405

(58) Field of Classification Search
USPC ........... 375/259–285, 219–223; 708/403–409
See application file for complete search history.

(56) References Cited

U.S. PATENT DOCUMENTS

| | | | |
|---|---|---|---|
| 5,289,406 A | | 2/1994 | Uramoto et al. |
| 6,728,699 B1* | | 4/2004 | Lautzenheiser et al. ..... 707/999.003 |
| 7,315,878 B2* | | 1/2008 | Han ..... 708/404 |
| 2002/0196876 A1* | | 12/2002 | Takada ..... 375/346 |
| 2003/0212722 A1* | | 11/2003 | Jain et al. ..... 708/404 |
| 2008/0071847 A1* | | 3/2008 | Cho et al. ..... 708/404 |

FOREIGN PATENT DOCUMENTS

EP    1538533 A2    6/2005
JP    04-209397 JP    7/1992

* cited by examiner

*Primary Examiner* — Shuwang Liu
*Assistant Examiner* — Ross Varndell
(74) *Attorney, Agent, or Firm* — Brundidge & Stanger, P.C.

(57) ABSTRACT

Implementations related to power reduction in physical layer wireless communications are disclosed.

32 Claims, 6 Drawing Sheets

600 A computer program product.

602 A signal bearing medium.

604 at least one of
    one or more instructions for receiving input data for FFT processing, the FFT processing to generate result data from the input data;

one or more instructions for determining, prior to FFT processing the input data, whether the result data corresponding to the input data has been previously stored in memory;

one or more instructions for retrieving the result data from the memory if the result data has been previously stored in the memory;

one or more instructions for using the input data to access a look-up table;

one or more instructions for accessing entries of the look-up table, wherein the entries reference memory locations;

one or more instructions for preloading the memory with the result data;

one or more instructions for refraining from FFT processing the input data if the result data is stored in memory;

one or more instructions for FFT processing the input data to generate the result data if the determination of whether the result data corresponding to the input data has been previously stored in memory fails;

one or more instructions for storing the result data in memory for use in further FFT processing; or one or more instructions for updating a lookup table in response to storing the result data in memory.

| 606 a computer-readable medium. | 608 a recordable medium. | 610 a communications medium. |

FIG. 6

POWER REDUCTION IN PHYSICAL LAYER WIRELESS COMMUNICATIONS

BACKGROUND

The field of wireless communications has received considerable attention, but the field of implementing low power wireless communications at the microarchitectural level has not. In wireless communications, physical layer (PHY) transmission and reception pipelines act, in part, to transform communications data between time and frequency domains. Although the act of transforming data between time and frequency domains is power intensive, conventional PHY pipelines undertake such transformations for all communications data they process.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 illustrates an example computer program product; and

DETAILED DESCRIPTION

Figure 1:
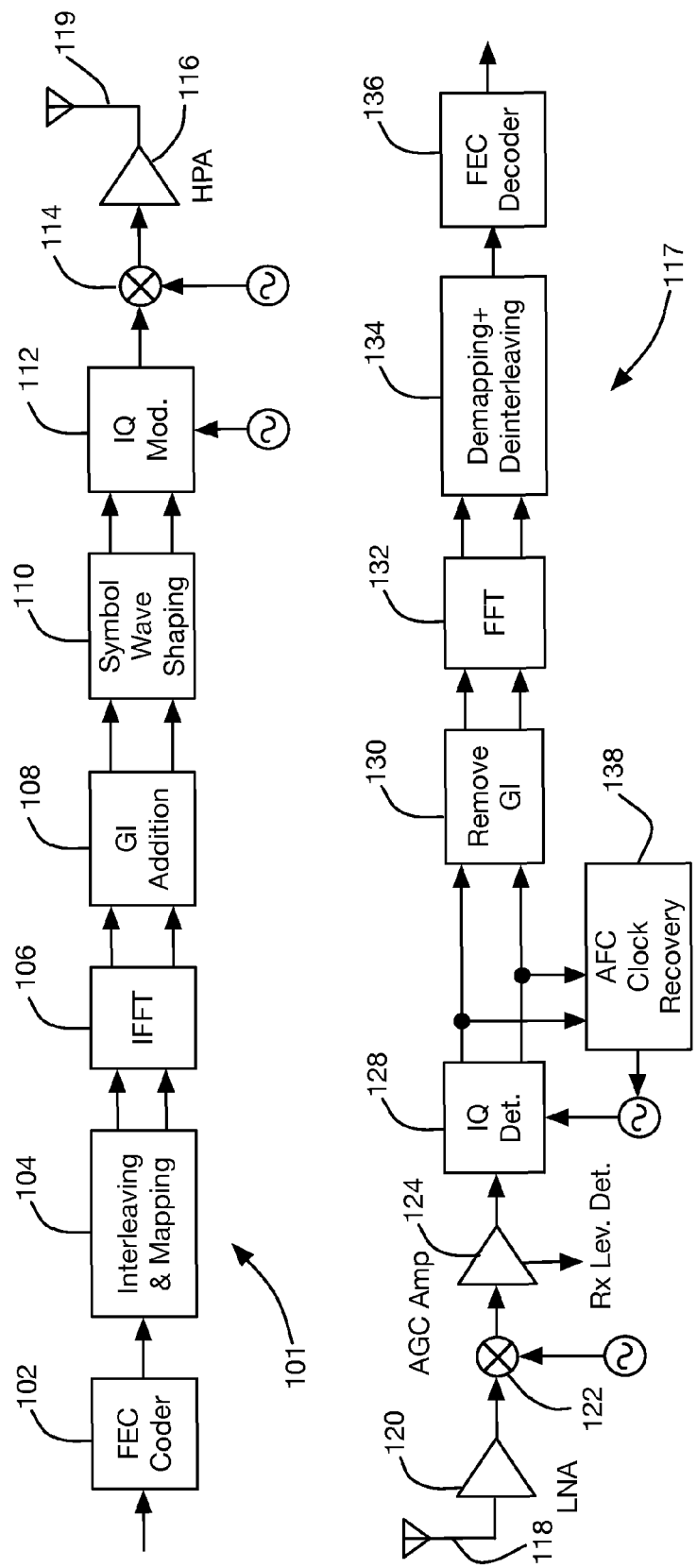
FIG. 1 illustrates a physical transmission and reception pipeline.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to power reduction in wireless communications.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

Claimed subject matter may be illustrated in the context of wireless communications. Specifically, the following description refers to wireless communications in the context of orthogonal frequency domain multiplexing (OFDM) systems and devices employing the IEEE 802.11a standard (available from standards.ieee.org/getieee802). However, claimed subject matter is not limited to specific types of communications systems, devices, methods or standards and the techniques disclosed herein should not be viewed as limited to a particular communications environment, wireless or otherwise. For example, claimed subject matter may also be implementable in systems conforming with other communications standards, for example, ultra wideband (IEEE Std. 802.15 available from standards.ieee.org/getieee802) and HiperLAN/2 (available from portal.etsi.org/Website/Standards/Standard.aspx). Accordingly, the specification and drawings are to be regarded in an illustrative rather than restrictive sense and claimed subject matter measured only in terms of the accompanying claims.

FIG. 1 illustrates a high-level block diagram of an example physical (PHY) transmission and reception pipeline 100 in accordance with IEEE 802.11a-1999 OFDM schemes. Pipeline 100 includes a transmit path 101 and a receive path 117. Transmit path 101 includes a Forward Error Correction (FEC) coder module 102, an interleaving and mapping (IM) module 104, an Inverse Fast Fourier Transform (IFFT) module 106, a guard interval (GI) addition module 108, a symbol wave shaping module 110, an In-phase/Quadrature (I/Q) modulation module 112, a mixer 114, a High Power Amplifier (HPA) 116 and an antenna 119. Receive path 117 includes an antenna 118, Low Noise Amplifier (LNA) 120, a mixer 122, an Automatic Gain Control (AGC) amplifier 124, an I/Q detect module 128, an AFC clock recovery module 138, a GI removal module 130, Fast Fourier Transform (FFT) module 132, demapping and deinterleaving module 134 and FEC decoder 136.

Antennas 118 and 119 may be any suitable antenna including but not limited to dish, parabolic, panel, sector, omnidirectional, etc. Further, in light of the present disclosure those skilled in the art will recognize that rather than two antennas 118/119 a pipeline 100 may employ a single antenna used by both transmit path 101 and receive path 117. The structure and/or functions of items 102, 104, 108, 110, 112, 114, 116, 118, 119, 120, 122, 124, 128, 130, 134, 136 and 138 are well known to those skilled in the art and will be not be described in any greater detail herein.

Those skilled in the art, in light of the present disclosure, will also recognize that various items of FIG. 1 may be implemented in hardware, firmware, software or combinations thereof. For example, High Power Amplifier (HPA) 116 and at least portions of IFFT module 106 and/or FFT module 132 may be implemented in hardware while other items, such as FEC coder module 102, may be implemented largely if not completely in software. Further, pipeline 100 or portions thereof, or similar pipelines or portions thereof implementing OFDM techniques, may be utilized in any number of systems and/or devices employing wireless communications including, but not limited to, cellular telephone handsets, radio transceivers, computers (laptop or otherwise), smart telephones, personal digital assistants (PDAs), etc.

In pipeline 100, transmit path 101 receives wireless communications data and utilizes IFFT module 106 to transform discrete signals in the frequency domain, which have been derived from the wireless communications data, into a corresponding discrete time domain representation. The signals transformed by IFFT module 106 and/or FFT module 132 may be digital, analog, or any combination thereof. Specifically, IFFT module 106 may perform an IFFT operation on multiple frequency domain subcarriers, or frequency domain data, provided by IM module 104 to generate an interleaved and time mapped signal, or time domain data, provided to GI addition module 108. Conversely, receive path 117 utilizes FFT module 132 to transform time domain data into corresponding frequency domain data. Specifically, FFT module 132 may perform an FFT operation on an interleaved and time mapped signal provided by GI removal module 130 to generate multiple frequency domain subcarriers summed in a single in-phase/quadrature time domain sequence and provided to demapping and deinterleaving module 134. In general terms, FFT module 132 and/or IFFT module 106 may be described as transforming input data into result data. In performing the respective transforms, IFFT module 106 and FFT module 132 may utilize common hardware while employing different signs of coefficients and different constant factors depending upon which transform is being undertaken.

Figure 2:
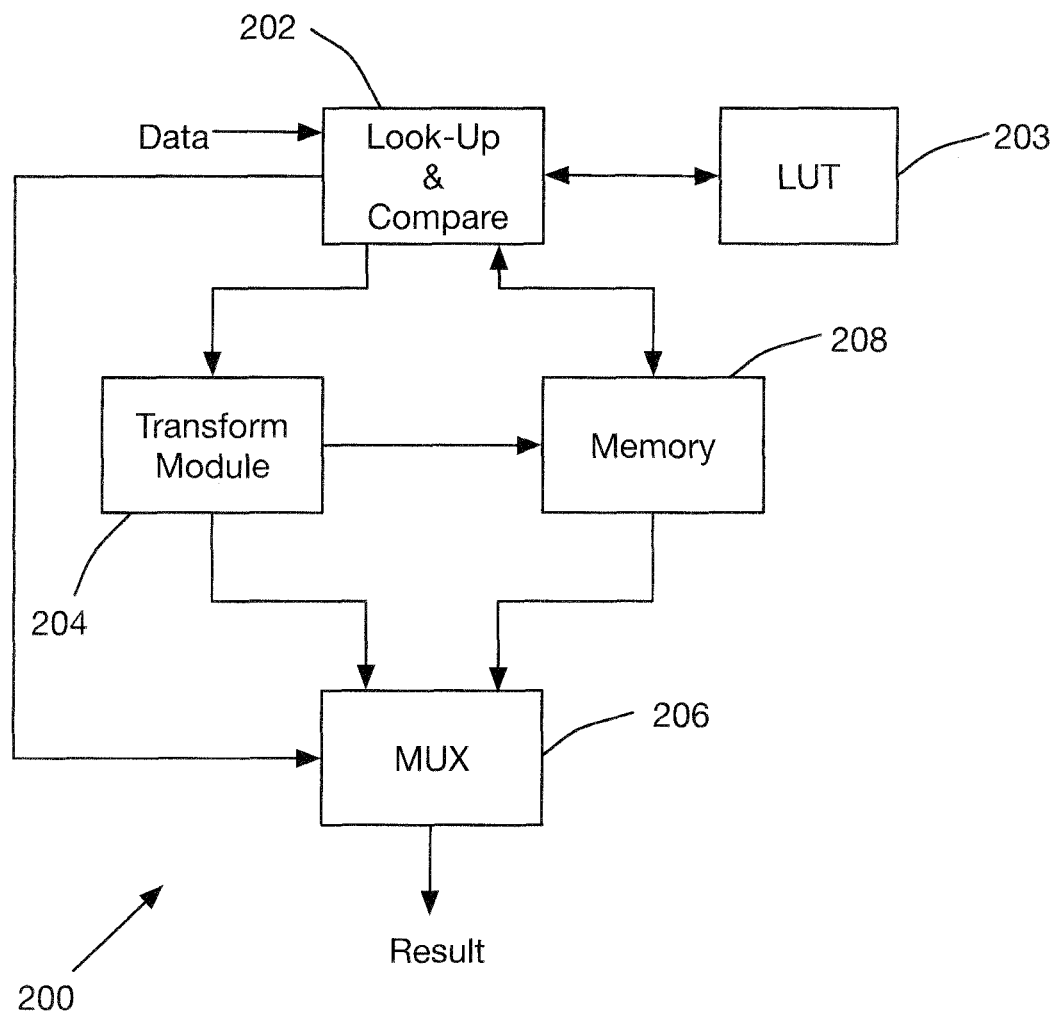
FIG. 2 illustrates a module of an example wireless communications device.

FIG. 2 illustrates an FFT/IFFT module 200 in accordance with some implementations of claimed subject matter. In one implementation, the functionality of IFFT module 106 and/or FFT module 132 of pipeline 100 may be provided by module 200. Module 200 includes Lookup and Compare (L&C) module 202, a Look-Up Table (LUT) 203, transform module 204, a multiplexer (MUX) 206 and memory 208. When undertaking an IFFT operation, module 200 may receive input data in the frequency domain and may transform that data into result data in the time domain using transform module 204. When undertaking an FFT operation, module 200 may receive input data in the time domain and may transform that data into the frequency domain also using transform module 204. While module 200 may be described as receiving input in the form of "data" to be processed by transform module 204, the term data, as used herein, should be broadly construed to encompass, among other things, components of digital signals, analog signals or any combinations thereof. Again, as noted above, the term data may include representations of either time domain signals or of frequency domain signals. Those skilled in the art will recognize, in light of the present disclosure, that transform module 204 may include, in some implementations, Butterfly logic although claimed subject matter is not limited in this regard.

In module 200, L&C module 202 receives input data from a pipeline unit such as GI removal module 130 or IM module 104 and provides that input data to transform module 204 for processing. After FFT or IFFT processing of the input data, transform module 204 provides the corresponding result data to MUX 206. L&C module 202 causes MUX 206 to provide either the result data from transform module 204 or stored result data from memory 208 as the output of module 200 as will be explained in further detail below.

In accordance with some implementations of claimed subject matter, when FFT/IFFT module 200 receives input data for IFFT or FFT processing, L&C module 202 first determines whether or not memory 208 holds the corresponding result data. In other words, rather than directly providing the input data to module 204 for processing, module 202 first checks the contents of memory 208 to see if the result data is already available and, hence, does not need to be generated anew by transform module 204. If L&C module 202 determines that the result is stored in memory 208, then L&C module 202 may cause MUX 206 to provide that stored result as the output or result data of module 200. Alternatively, if L&C module 202 determines that the result is not stored in memory 208, then L&C module 202 may provide the input data to transform module 204 and cause MUX 206 to provide the corresponding result data generated by transform module 204 as the output of module 200.

In some implementations of claimed subject matter, memory 208 may be a read-only memory (ROM) that, prior to or during manufacture of a system or device that includes FFT/IFFT module 200, is provided or pre-loaded with results that may be generated by IFFT and/or FFT operations in an OFDM pipeline such as pipeline 100. In some implementations, for example, the result data pre-loaded in memory 208 may be known by a manufacturer of module 200 to be results that are likely to be generated by an ODFM pipeline.

In accordance with some implementations of claimed subject matter, result data stored in memory 208 may be correlated with associated input data by LUT 203 or similar data structure(s) within or accessible by L&C module 202. When L&C module 202 determines that memory 208 does not contain a result corresponding to particular input data then L&C module 202 may provide that input data to transform module 204 to undertake IFFT and/or FFT operations thereon. L&C module 202 may then cause MUX 206 to provide the output of transform module 204 back to the pipeline. In some implementations, transform module 204 may place results of IFFT and/or FFT operations in memory 208 and LUT 203 may be updated so that, during subsequent requests for IFFT and/or FFT operations using the same input data, L&C module 202 may determine that the corresponding result data is stored in memory 208 and therefore may be provided directly to the pipeline via MUX 206 rather than having transform module 204 generate the identical result. Those skilled in the art, in light of the present disclosure, will recognize how data, such as input data for FFT or IFFT operations, may be used to look-up other data, such as result data, using look-up techniques and thus such techniques will not be described in greater detail herein.

In some implementations, the functionality of L&C module 202 may be implemented in software. For example, the functionality of L&C module 202 described herein may be provided by one or more algorithms executing on a processor or other logic.

Those skilled in the art in light of the present disclosure will recognize that the structure and/or function transform module 204 may be provided in hardware by an array or arrays of fixed-point multipliers implemented in, for example, a processor such as a baseband processor, although claimed subject matter is not limited in this regard. Regardless, the various elements of FIG. 2 may be implemented in hardware, firmware, software or combinations thereof.

In addition, the various components of module 200 may operate in a somewhat different manner than that described herein without departing from the scope of claimed subject matter. For example, in addition to receiving input data for ultimate processing by transform module 204, L&C module 202 may also perform modifications such as changing the format of the input data, normalizing the input data, etc. before providing the modified input data to transform module 204 for processing. Further, module 200 may include or be associated with other components that have not been shown in FIG. 2 in order to avoid obscuring claimed subject matter. Thus, for example, a memory controller (not shown) may provide well known memory access and control functions for use by, for example, L&C module 202, in interacting with memory 208.

Figure 3:
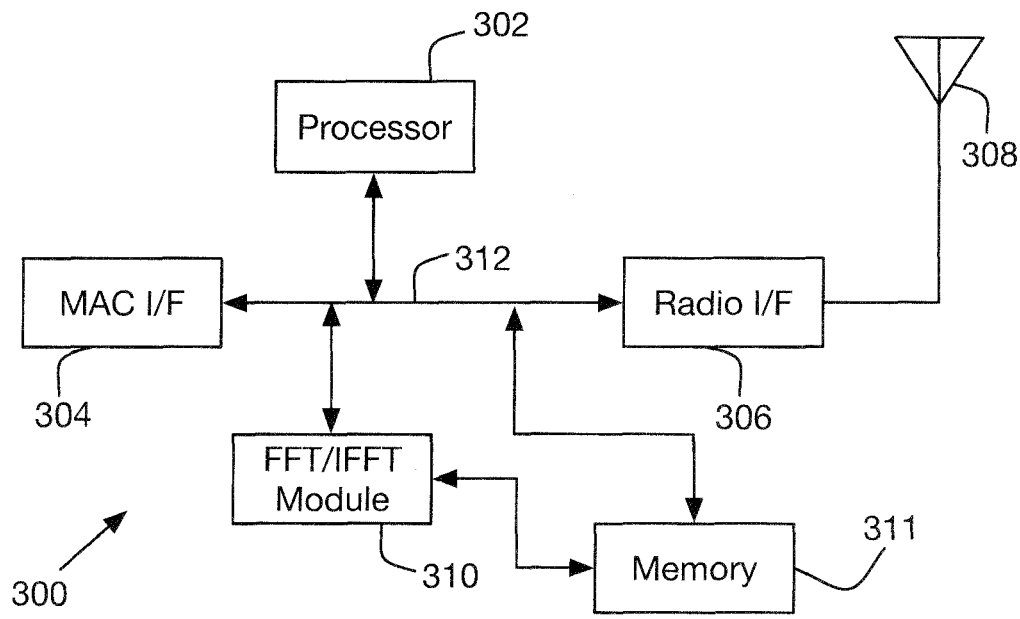
FIG. 3 illustrates an example wireless communications system.

FIG. 3 is a block diagram of an example system 300. System 300 may be used to perform some or all of the various functions discussed above in connection with, for example, FIGS. 1 and 2. System 300 may include any device or collection of devices, such as a terminal device, capable of undertaking wireless communications. For example, system 300 may include selected components of a desktop computer, a laptop computer, a handheld computer, a game console, a smart and/or cellular telephone, a PDA, a radio handset, etc.

System 300 includes a processor 302 (e.g., Central Processing Unit (CPU), Digital Signal Processor (DSP), etc.) such as a processor capable of providing and/or facilitating various functions including those described herein, a Media Access Control Interface (MAC I/F) 304, a Radio I/F 306 coupled to an antenna 308, an FFT/IFFT module 310 such as module 200 described above, a memory 311, and a bus 312 communicatively coupling processor 302, MAC I/F 304, Radio I/F 306, FFT/IFFT module 310, and memory 311 to each other. The functions and structures of MAC I/F 304, Radio I/F 306, antenna 308, memory 311, and bus 312 are well known and won't be described in further detail herein other than to note that some components of pipeline 100 may be implemented in MAC I/F 304 or Radio I/F 306. For example, HPA 116 and AGC Amplifier 124 may be implemented in Radio I/F 306. Further, while FIG. 3 illustrates memory 311 separate from processor 302, processor 302 may include internal memory (not shown), which may also serve to store result data.

Processor 302 may be any processor capable of undertaking one or more operations associated with pipeline 100. For example, processor 302 may undertake operations associated with IM module 104, GI addition module 108, symbol wave shaping module 110, I/Q modulation module 112, I/Q detect module 128, GI removal module 130 and demapping and deinterleaving module 134, although claimed subject matter is not limited in this regard. In addition, although not shown in FIG. 3, other components of pipeline 100 such as FEC coder 102 and/or FEC decoder 136 may be implemented as separate modules coupled to bus 312.

Those skilled in the art in light of the present disclosure will recognize that processor 302 and/or bus 312 may be further coupled to one or more controllers, such as a memory controller, not shown in FIG. 3, to facilitate the communication of information, such as input data or result data, between processor 302, FFT/IFFT module 310 and/or memory 311. Although system 300 is shown with a particular configuration of components, other implementations are possible using any of a wide range of configurations. Further, in light of the present disclosure those skilled in the art will recognize that system 300 may include many additional components such as a display etc., not particularly germane to claimed subject matter, that have not been illustrated in FIG. 3 in the interests of not obscuring claimed subject matter.

Figure 4:
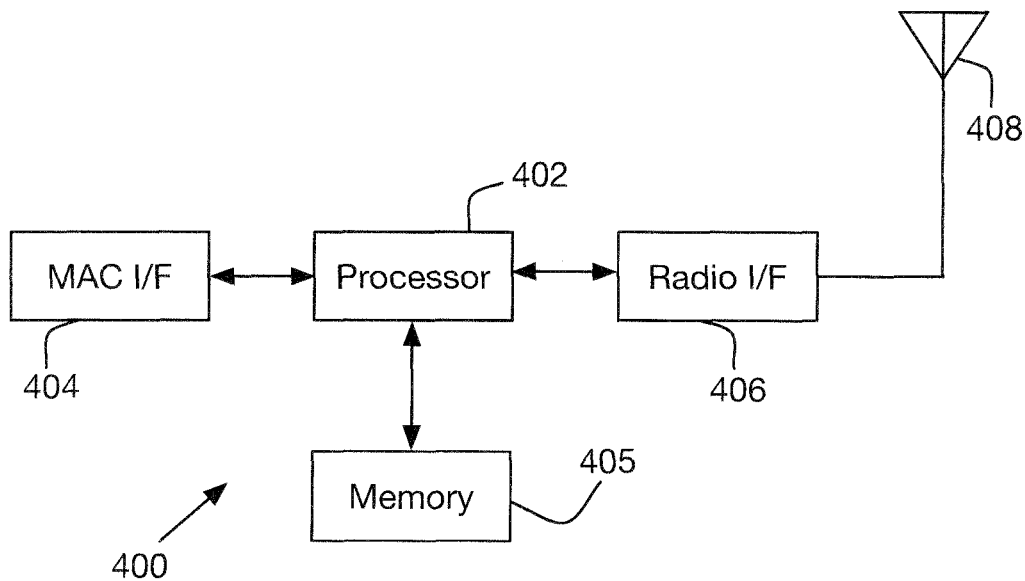
FIG. 4 illustrates another example wireless communications system.

FIG. 4 is a block diagram of another example system 400. System 400 may be used to perform some or all of the various functions discussed above in connection with, for example, FIGS. 1 and 2. System 400 may include any device or collection of devices, such as a terminal device, capable of undertaking wireless communications. For example, system 400 may include selected components of a desktop computer, a laptop computer, a handheld computer, a game console, a smart and/or cellular telephone, a PDA, a radio handset, etc.

System 400 includes a processor 402 (e.g., Central Processing Unit (CPU), Digital Signal Processor (DSP), Baseband Processor etc.) such as a processor capable of providing the various functions of a FFT/IFFT module such as module 200 described above, a Media Access Control Interface (MAC I/F) 404 coupled to processor 402, a memory 405 coupled to processor 402, and a Radio I/F 406 coupled both to processor 402 and to an antenna 408. The functions and structures of MAC I/F 404, Radio I/F 406 and antenna 408 are well known and won't be described in further detail herein other than to note that some components of pipeline 100 may be implemented in MAC I/F 404 or Radio I/F 406. For example, HPA 116 and AGC Amplifier 124 may be implemented in Radio I/F 406.

Processor 402 may be any processor capable of undertaking one or more operations associated with an OFDM pipeline including the FFT/IFFT functions performed by module 200 of FIG. 2. In addition, processor 402 may also perform the functions associated with IM module 104, GI addition module 108, symbol wave shaping module 110, I/Q modulation module 112, I/Q detect module 128, GI removal module 130 and/or demapping and deinterleaving module 134, although claimed subject matter is not limited in this regard. In addition, although not shown in FIG. 4, other components of an OFDM pipeline such as FEC coder 102 and/or FEC decoder 136 of pipeline 100 may be implemented within processor 402 or as separate modules (not shown) coupled to processor 402.

Those skilled in the art in light of the present disclosure will recognize that processor 402 may be further coupled to one or more controllers, such as a memory controller, not shown in FIG. 4, to facilitate the communication of information, such as result data, between processor 402 and memory 405. Although system 400 is shown with a particular configuration of components, other implementations are possible using any of a wide range of configurations. Further, in light of the present disclosure those skilled in the art will recognize that system 400 may include many additional components such as a display etc., not particularly germane to claimed subject matter, that have not been illustrated in FIG. 4 in the interests of not obscuring claimed subject matter. Further, while FIG. 4 illustrates memory 405 separate from processor 402, processor 402 may include internal memory (not shown), which may also serve to store result data.

Figure 5:
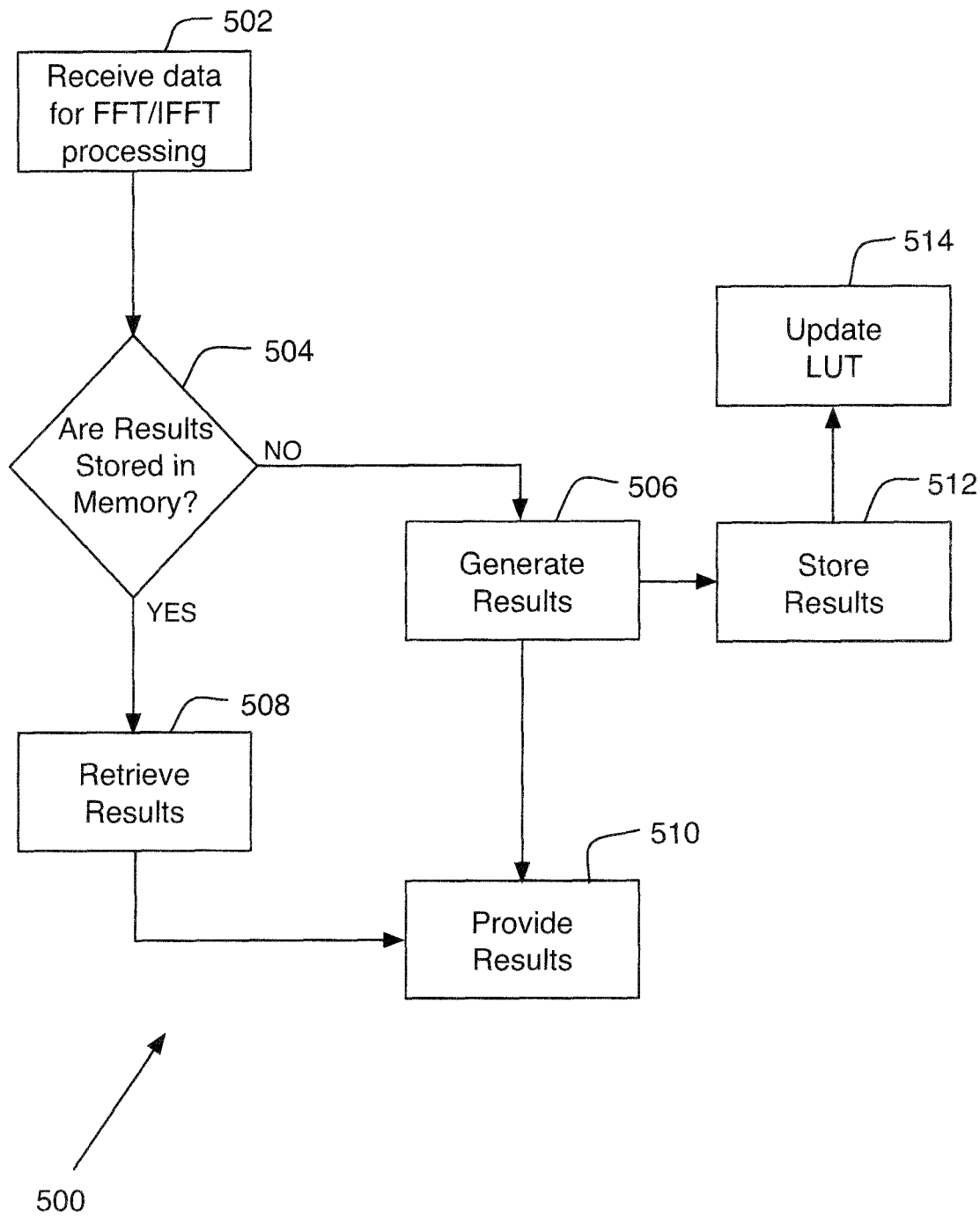
FIG. 5 illustrates an example wireless communications method.

FIG. 5 illustrates an example power reduction process 500. Process 500 sets forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 5 may be practiced in accordance with claimed subject matter.

Process 500 begins with receiving data for FFT/IFFT processing at block 502. For example, referring to the discussion of FIG. 2, in one implementation block 502 may include L&C module 202 receiving input data in the form of time domain data or frequency domain data for FFT/IFFT processing where that input data may be provided by an ODFM pipeline such as pipeline 100 of FIG. 1. In block 504, it may be determined whether result data corresponding to the FFT/IFFT processing of the input data received in block 502 were previously stored in memory. For example, in one implementation, block 504 may involve accessing a look-up table by using the input data, or data derived from the input data, as an index to the lookup table, such as lookup table 203 of FIG. 2, to determine whether corresponding result data has been previously calculated for the input data received in block 502 and was subsequently stored in memory. Accessing a look-up table may include using the input data, or data derived from the input data, as an index to one or more entries in the look-up table where those entries reference memory locations or addresses storing the result data. In some implementations, an algorithm executing on, for example, processors 302 or 402 of FIGS. 3 or 4 respectively, may undertake block 504.

If the result of block 504 is negative, that is, if result data corresponding to the input data received in block 502 are not stored in memory, then process 500 may branch to block 506 where the result data may be generated by undertaking FFT or IFFT processing of the input data. In some implementations, block 506 may involve having transform module 204 of FIG. 2 undertake the FFT or IFFT processing of the input data to generate result data. The specific details of the FFT or IFFT processing undertaken in block 504 are well known in the art and will not be described in greater detail herein.

If the result of block 504 is positive, that is, if result data corresponding to the input data received in block 502 are stored in memory, then process 500 may branch to block 508 where result data corresponding to the FFT or IFFT processing of the input data may be retrieved from memory. In some implementations, block 504 may involve retrieving the result data from, for example, memory 208 of FIG. 2. Process 500 may then proceed to block 510 where the result data, either retrieved in block 508 or generated in block 506, may be provided as output data. For example, referring to FIG. 2, in one implementation, block 510 may involve having L&C module 202 provide a control signal to MUX 206 directing it to provide either the result data output of transform module 204 or the stored result data retrieved from memory 208.

In some implementations, the result data generated in block 506 may be stored in block 512. For example, referring to FIG. 2, subsequent to transform module 204 calculating the FFT or IFFT result data, block 512 may involve storing the corresponding result data in memory 208. In addition, in block 514, a LUT may be updated to indicate that the result data of the FFT or IFFT processing of the input data received in block 502 has been stored in memory. For example, L&C module 202 may undertake block 514 by updating LUT 203 to indicate that memory 208 holds the result data generated in block 506.

FIG. 6 illustrates an example computer program product 600. Program product 600 includes a signal bearing medium 602. Signal bearing medium 602 includes one or more instructions 604 that, when executed by, for example, a processor, provide the functionality described above with respect to FIGS. 1-5. Thus, for example, referring to the system of FIG. 3, processor 302 in conjunction with FFT/IFFT module 310 may undertake one or more of the functional blocks shown in FIG. 5 in response to instructions 604 conveyed by medium 602. Similarly, referring to the system of FIG. 4, processor 402 may undertake one or more of the functional blocks shown in FIG. 5 in response to instructions 604 conveyed by medium 602.

In some implementations, signal bearing medium 602 may encompass a computer-readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, referring to the system of FIG. 4, computer program product 600 may be wirelessly conveyed to processor 402 (via antenna 408 and radio I/F 406) by an RF signal bearing medium 602, where the signal bearing medium 602 is conveyed to system 400 by a wireless communications medium 610 (e.g., an 802.11 wireless communications medium).

Figure 7:
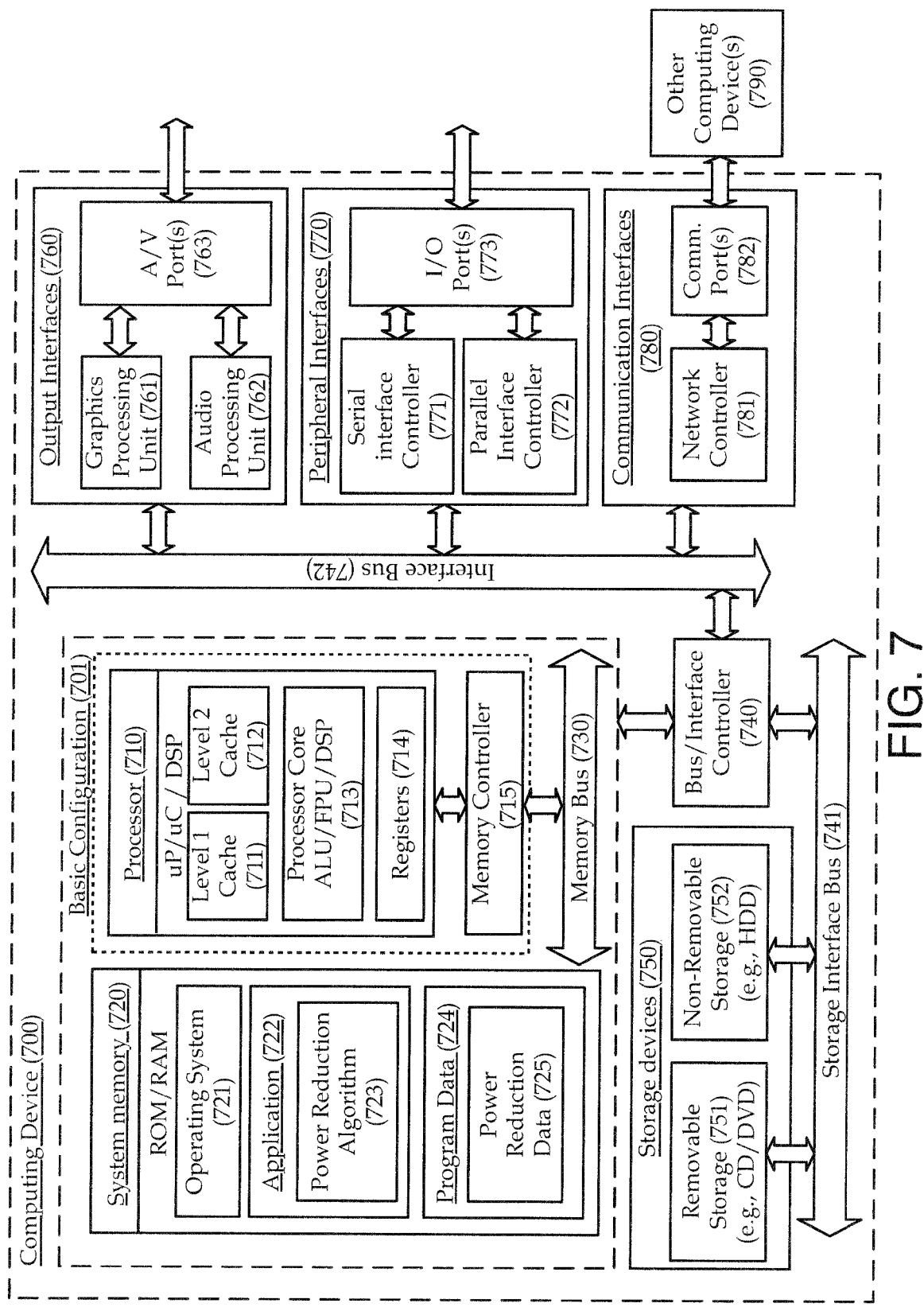
FIG. 7 illustrates an example computing device, all arranged in accordance with the present disclosure.
Figure 7:
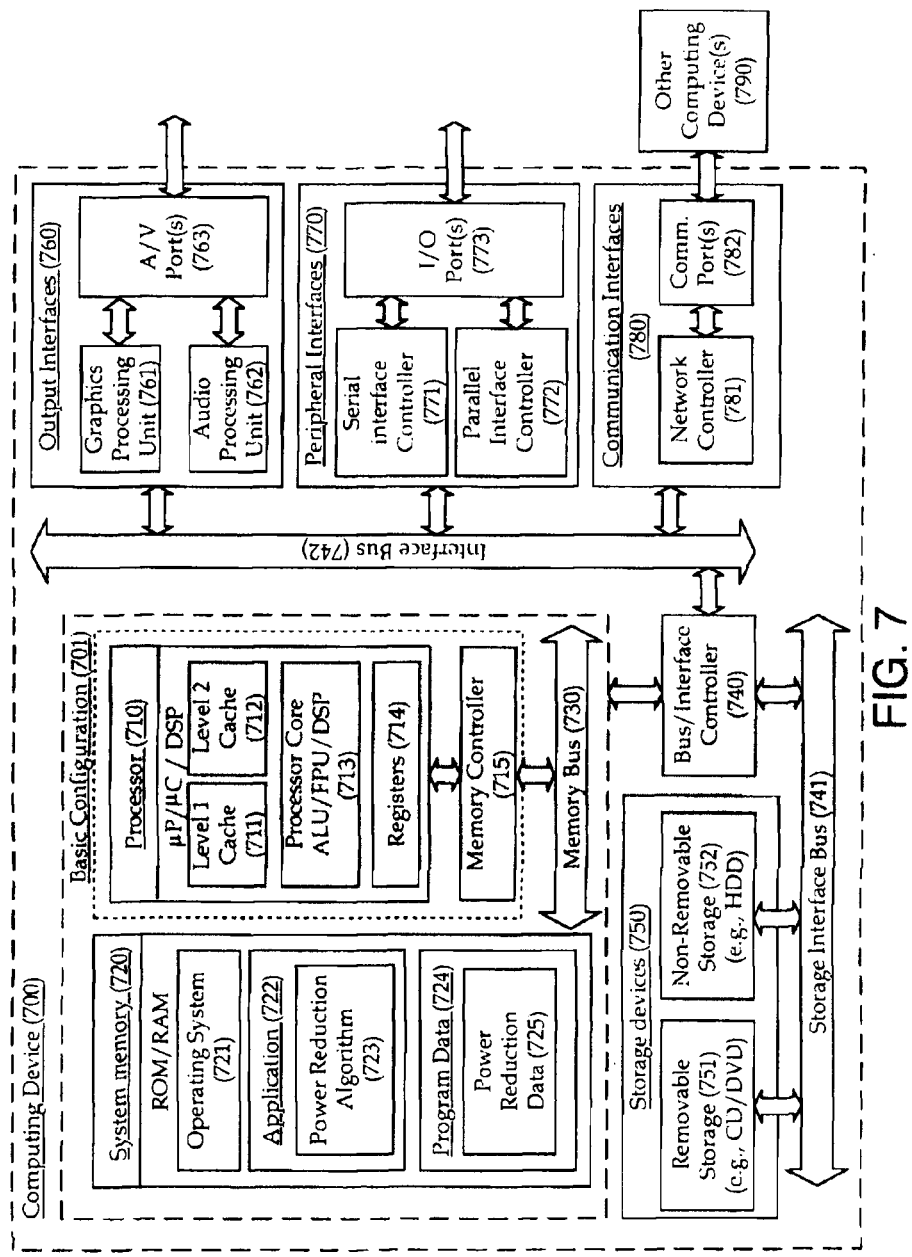

FIG. 7 is a block diagram illustrating an example computing device 700 that is arranged for power reduction in physical layer wireless communications in accordance with the present disclosure. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes a power reduction algorithm 723 that is arranged to perform the functions as described herein including the actions described with respect to process 500 of FIG. 5. Program Data 724 includes power reduction data 725, such as result data, that is useful for implementing power reduction algorithm 723. In some example embodiments, application 722 can be arranged to operate with program data 724 on an operating system 721 such that implementations of power reduction in physical layer wireless communications may be provided as described herein. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more A/V ports 763. Example peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for reducing power consumption in wireless communications during Fast Fourier Transform processing by a transform module in a device, comprising:
 receiving input data by a physical layer (PHY) pipeline from an antenna, the PHY pipeline comprising a lookup and compare module;
 determining, by the lookup and compare module, prior to Fast Fourier Transform or Inverse Fast Fourier Transform processing the input data, whether result data corresponding to the Fast Fourier Transform or Inverse Fast Fourier Transform processing the input data has been previously stored in memory;
 in response to determining that the result data has been previously stored in the memory, the lookup and compare module is configured to retrieve the result data from the memory;
 in response to determining that the result data has not been previously stored in the memory, the transform module is configured to:
  modify the input data and perform the Fast Fourier Transform or Inverse Fast Fourier Transform on the modified input data to generate the result data, and
  provide the result data, wherein a reduction of power consumption is facilitated;
 store the result data in the memory for use in further Fast Fourier Transform or Inverse Fast Fourier Transform processing in response to the result data having not been previously stored in the memory; and
 update a lookup table in response to storing the result data in memory.

2. The method of claim 1, wherein the determining whether the result data is available has been previously stored in the memory comprises using the input data to access a look-up table.

3. The method of claim 2, wherein the using the input data to access the look-up table comprises accessing entries of the look-up table, wherein the entries reference memory locations.

4. The method of claim 1, wherein the modifying the input data comprises changing a format of the input data, normalizing the input data, or changing the format of the input data and normalizing the input data.

5. The method of claim 1, further comprising:
 preloading the memory with the result data.

6. The method of claim 1, further comprising:
 refraining from the Fast Fourier Transform or Inverse Fast Fourier Transform processing the input data in response to the result data having been previously stored in the memory.

7. A device for reducing power consumption in wireless communications comprising:
 a lookup and compare module configured to receive input data;
 a transform module, coupled to the lookup and compare module, the transform module configured to Fast Fourier Transform (FFT) or Inverse Fast Fourier Transform (IFFT) process the received input data into result data;
 memory coupled to the lookup and compare module and the transform module, the memory configured to store the result data from the transform module and the received input data from the lookup and compare module; and
 a multiplexer coupled to the lookup and compare module, the transform module, and the memory, the multiplexer configured to provide the result data as output data;
 wherein the lookup and compare module is further configured to determine, prior to the transform module processing particular input data, whether the memory already stores particular result data corresponding to the particular input data;
 wherein in response to the memory already storing the particular result data, the lookup and compare module is further configured to retrieve the particular result data from the memory and to cause the multiplexer to provide the particular result data from the memory as the output data; and
 wherein in response to the memory not already storing the particular result data, the lookup and compare module is further configured to:
  modify the particular input data, and
  provide the modified particular input data to the transform module to generate the particular result data and to provide the particular result data from the transform module as the output data.

8. The device of claim 7, wherein, in response to the memory already storing the particular result data, the lookup and compare module is configured to cause the transform module to refrain from the FFT processing of the particular input data.

9. The device of claim 7, wherein the lookup and compare module comprises software.

10. The device of claim 7, wherein the lookup and compare module is further configured to determine whether the memory stores the particular result data corresponding to the particular input data by accessing a lookup table.

11. The device of claim 7, wherein the lookup and compare module is further configured to change a format of the particular input data and normalize the particular input data in modifying the particular input data.

12. The device of claim 7, wherein the memory is preloaded with the result data.

13. The device of claim 7, wherein the second transform module comprises Butterfly logic.

14. A system for reducing power consumption during FFT processing, in wireless communications comprising:
 an antenna configured to receive wireless communications data;
 a physical layer (PHY) pipeline coupled to the antenna and configured to receive the wireless communications data from the antenna and to convert the wireless communications data into frequency domain data, wherein the PHY pipeline comprises a lookup and compare module coupled to a transform module; and
 memory coupled to the PHY pipeline,
 wherein the lookup and compare module is configured to determine whether the memory stores frequency domain data corresponding to the communications data;
 wherein, in response to the memory not already storing the frequency domain data, the lookup and compare module is further configured to retrieve the frequency domain data from the memory;

wherein, in response to the memory not already storing the frequency domain data, the lookup and compare module is further configured to:
  modify the wireless communications data, and
    provide the modified wireless communications data to the transform module to generate the frequency domain data; and
wherein the transform module is further configured to refrain from converting the wireless communications data into the frequency domain data in response to the lookup and compare module determining that the memory stores the frequency domain data.

15. The system of claim 14, wherein the PHY pipeline further comprises a module multiplexer coupled to both the lookup and compare module and the transform module, wherein, in response to the lookup and compare module determining that the memory stores the frequency domain data, the lookup and compare module is further configured to cause the multiplexer to provide the frequency domain data from the memory.

16. The system of claim 14, wherein the lookup and compare module is configured to change a format of the wireless communication data and normalize the wireless communication data in response to modifying the wireless communication data.

17. The system of claim 14, wherein the transform module comprises Butterfly logic.

18. The system of claim 14, wherein the determining whether the memory stores the frequency domain data corresponding to the wireless communications data comprises accessing a look-up table.

19. The system of claim 14, wherein the memory comprises one of flash memory or read-only memory.

20. The system of claim 14, wherein the memory is preloaded with the frequency domain data.

21. The system of claim 14, wherein the PHY pipeline comprises an orthogonal frequency domain multiplexing (OFDM) pipeline.

22. An article comprising a non-transitory computer program product having stored therein instructions that, in response to being executed, comprises:
  receiving input data by a physical layer (PHY) pipeline from an antenna for Fast Fourier Transform or Inverse Fast Fourier Transform processing by a transform module, the PHY pipeline comprising a lookup and compare module;
  determining, by the lookup and compare module, prior to the Fast Fourier Transform or Inverse Fast Fourier Transform processing the input data, whether result data corresponding to the Fast Fourier Transform or Inverse Fast Fourier Transform processing the input data has been previously stored in memory;
  in response to determining that the result data has been previously stored in the memory, the lookup and compare module is configured to retrieve the result data from the memory;
  in response to determining that the result data has not been previously stored in the memory, the transform module is configured to:
    modify the input data and performing a Fast Fourier Transform or Inverse Fast Fourier Transform on the modified input data to generate the result data, and
    provide the result data, wherein a reduction of power consumption is facilitated;
  store the result data in the memory in response to the result data having not been previously stored in the memory; and
  update a lookup table in response to storing the result data in memory.

23. The article of claim 22, wherein the determining whether the result data has been previously stored in the memory comprises using the input data to access a look-up table.

24. The article of claim 23, wherein the using the input data to access the look-up table comprises accessing entries of the look-up table, wherein the entries reference memory locations.

25. The article of claim 22, wherein the modifying the input data comprises changing a format of the input data, normalizing the input data, or changing the format of the input data and normalizing the input data.

26. The article of claim 22, wherein the non-transitory computer program product having stored therein instructions that, in response to being executed, further comprises preloading the memory with the result data.

27. The article of claim 22, wherein the non-transitory computer program product having stored therein instructions that, in response to being executed, further comprises refraining from the Fast Fourier Transform or Inverse Fast Fourier Transform processing the input data in response to the result data having been previously stored in the memory.

28. A system for reducing power consumption in wireless communications comprising:
  a processor, a media access control interface module, a Fast Fourier Transform (FFT) /Inverse Fast Fourier Transform (IFFT) module, and a radio interface module each coupled to a bus to form a transmission and reception pipeline configured to provide operations related to the transmission and reception pipeline; and
  an antenna coupled to the radio interface module, wherein the antenna and the radio interface module are configured as a transceiver to both transmit and receive communications data;
  wherein the FFT/IFFT module is configured to provide FFT or IFFT output data based on input data and wherein the FFT/IFFT module comprises:
    a lookup and compare module coupled to a memory, wherein the lookup and compare module is configured to:
      determine whether the memory holds the FFT or IFFT output data corresponding to the input data and causes a multiplexer to provide the FFT or IFFT output data from the memory in response to determining that the memory holds the FFT or IFFT output data corresponding to the input data, and
      modify the input data in response to determining that the memory does not hold the FFT or IFFT output data corresponding to the input data; and
    a transform module configured to perform an FFT or IFFT operation on the modified input data and to provide the FFT or IFFT output data to the multiplexer in response to the lookup and compare module determining that the memory does not hold the FFT or IFFT output data corresponding to the input data.

29. The system of claim 28, wherein the transform module comprises Butterfly logic.

30. The system of claim 28, wherein the memory comprises one of flash memory or read-only memory.

31. The system of claim 28, wherein the lookup and compare module is configured to change a format of the input data and normalize the input data when modifying the input data.

32. The system of claim 28, wherein the antenna comprises one of a dish antenna, a parabolic antenna, a panel antenna, a sector antenna, or an omnidirectional antenna.

* * * * *

UNITED STATES PATENT AND TRADEMARK OFFICE
CERTIFICATE OF CORRECTION

| | |
|---|---|
| PATENT NO. | : 8,861,649 B2 |
| APPLICATION NO. | : 12/390957 |
| DATED | : October 14, 2014 |
| INVENTOR(S) | : Conte |

It is certified that error appears in the above-identified patent and that said Letters Patent is hereby corrected as shown below:

In the Drawings,

In the drawing sheet, consisting of Fig. 7, should be deleted to be replaced with the drawing sheet, consisting of Fig. 7, as shown on the attached page.

In the Specification,

In Column 4, Line 39, delete "ODFM" and insert -- OFDM --, therefor.

In Column 7, Line 9, delete "ODFM" and insert -- OFDM --, therefor.

In Column 11, Line 27, delete "and or" and insert -- and/or --, therefor.

In the Claims,

In Column 14, Line 48, in Claim 13, delete "second transform" and insert -- transform --, therefor.

In Column 14, Line 64, in Claim 14, delete "memory not" and insert -- memory --, therefor.

Signed and Sealed this
Thirty-first Day of March, 2015

Michelle K. Lee
*Director of the United States Patent and Trademark Office*